(12) United States Patent
Guan et al.

(10) Patent No.: US 10,609,860 B1
(45) Date of Patent: Apr. 7, 2020

(54) ESTIMATING NITROGEN CONTENT USING HYPERSPECTRAL AND MULTISPECTRAL IMAGES

(71) Applicant: The Climate Corporation, San Francisco, CA (US)

(72) Inventors: Wei Guan, Fremont, CA (US); Ying Xu, Boston, MA (US)

(73) Assignee: The Climate Corporation, San Francisco, CA (US)

( * ) Notice: Subject to any disclaimer, the term of this patent is extended or adjusted under 35 U.S.C. 154(b) by 0 days.

(21) Appl. No.: 16/222,910

(22) Filed: Dec. 17, 2018

Related U.S. Application Data

(63) Continuation of application No. 15/231,505, filed on Aug. 8, 2016, now Pat. No. 10,154,624.

(51) Int. Cl.
    *G06K 9/00* (2006.01)
    *A01C 21/00* (2006.01)
    *A01G 22/00* (2018.01)
    *A01G 7/00* (2006.01)

(52) U.S. Cl.
    CPC ............ *A01C 21/007* (2013.01); *A01G 22/00* (2018.02); *G06K 9/00657* (2013.01); *A01G 7/00* (2013.01)

(58) Field of Classification Search
    CPC ...... A01G 22/00; A01G 7/00; G06K 9/00657; A01C 21/007
    See application file for complete search history.

(56) References Cited

U.S. PATENT DOCUMENTS

| | | | |
|---|---|---|---|
| 6,160,902 A * | 12/2000 | Dickson | G01J 3/2803 348/144 |
| 6,529,615 B2 | 3/2003 | Hendrickson et al. | |
| 7,068,816 B1 | 6/2006 | Knoblauch et al. | |
| 8,391,565 B2 | 3/2013 | Purcell et al. | |
| 2009/0210371 A1* | 8/2009 | Laan | G06K 9/6292 706/21 |
| 2010/0049082 A1* | 2/2010 | Hu | A61B 5/02028 600/561 |

(Continued)

OTHER PUBLICATIONS

Guan, U.S. Appl. No. 15/231,505, filed Aug. 8, 2016, Office Action, dated Mar. 26, 2018.

(Continued)

*Primary Examiner* — Amara Abdi
(74) *Attorney, Agent, or Firm* — Hickman Palermo Becker Bingham LLP; Malgorzata A. Kulczycka

(57) ABSTRACT

In an approach, hyperspectral and/or multispectral remote sensing images are automatically analyzed by a nitrogen analysis subsystem to estimate the value of nitrogen variables of crops or other plant life located within the images. For example, the nitrogen analysis subsystem may contain a data collector module, a function generator module, and a nitrogen estimator module. The data collector module prepares training data which is used by the function generator module to train a mapping function. The mapping function is then used by the nitrogen estimator module to estimate the values of nitrogen variables for a new remote sensing image that is not included in the training set. The values may then be reported and/or used to determine an optimal amount of fertilizer to add to a field of crops to promote plant growth.

18 Claims, 7 Drawing Sheets

(56) References Cited

U.S. PATENT DOCUMENTS

| | | | |
|---|---|---|---|
| 2013/0251246 A1* | 9/2013 | Tang .................... | G06K 9/6206 |
| | | | 382/159 |
| 2014/0137877 A1 | 5/2014 | Deevi et al. | |
| 2016/0055368 A1* | 2/2016 | Cao .................... | G06K 9/00268 |
| | | | 382/195 |
| 2018/0035605 A1 | 2/2018 | Guan | |

OTHER PUBLICATIONS

Guan, U.S. Appl. No. 15/231,505, filed Aug. 8, 2016, Notice of Allowance, dated Sep. 12, 2018.

The International Bureau of WIPO, "Search Report" in application No. PCT/US2017/044040, dated Feb. 12, 2019, 8 pages.

International Searching Authority, "Search Report" in application No. PCT/US2017/044040, dated Oct. 10, 2017, 12 pages.

Current Claims in application No. PCT/US2017/044040, dated Oct. 2017, 5 pages.

Current Claims in application No. PCT/US2017/044040, dated Feb. 2019, 5 pages.

\* cited by examiner (a)

ESTIMATING NITROGEN CONTENT USING HYPERSPECTRAL AND MULTISPECTRAL IMAGES

BENEFIT CLAIM

This application claims the benefit under 35 U.S.C. § 120 as a Continuation of application Ser. No. 15/231,505, filed Aug. 8, 2018, the entire contents of which is hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2016 The Climate Corporation.

FIELD OF THE DISCLOSURE

The present disclosure relates to computer-based systems that are programmed for monitoring plant health through the use of remote sensing data. The present disclosure more specifically relates to techniques which use hyperspectral and/or multispectral images of fields containing crops to determine the value of nitrogen related variables of those crops.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In agriculture, farmers need to balance the competing goals of supplying sufficient fertilizer for their crops while minimizing the cost and impact to the environment. Testing crops for nitrogen has historically involved collecting samples from plants within one or more plots of land and testing the samples using a spectrometer to measure the concentration of nitrogen found within the samples. However, the aforementioned testing methodology can take a significant amount of time since the samples would often need be collected manually for submission to a remote or on-site lab.

In past decades, researches have demonstrated that remote sensing techniques have the potential to estimate nitrogen content for different plants. Since remote sensing imagery can be taken for a large area of land, such as through use of satellites or aircrafts, remote sensing imagery can be far more convenient and efficient to collect than actual plant samples. Different remote sensing techniques have been developed for estimating variables that are related to the biophysical, physiological, or biochemical characteristics of plants.

According to the spectral resolutions of deployed sensors, imagery can either be hyperspectral or multispectral. The main difference between hyperspectral and multispectral imagery is the number of bands that can be detected, with hyperspectral images typically including 128 bands compared to 5-7 bands for multispectral images. In general, hyperspectral imagery is more powerful for selection of narrow bands which are sensitive to specific crop variables, such as nitrogen content. Extensive research has been done in the past to apply hyperspectral imagery to increase the sensitivity of the vegetation indices to chlorophyll, nitrogen, and other plant minerals. Such investigations have mainly been performed on leaf level or on canopies grown under controlled conditions. For example, one study has shown that leaf nitrogen content could be quickly estimated by measuring leaf reflectance at 550 nm. There are also a limited number of results on band selections where hyperspectral images were acquired under natural conditions. In addition, hyperspectral remote sensing images have been shown to have a lot of potential in estimating moisture and certain minerals in the soil. However, existing methods use either single band or certain vegetation indexes to estimate plant nitrogen content, rather than exploring the full potential of hyperspectral and multispectral imagery.

SUMMARY OF THE DISCLOSURE

The appended claims may serve as a summary of the disclosure.

BRIEF DESCRIPTION OF THE DRAWINGS

In the drawings:

FIG. 7 depicts an example embodiment of a spreadsheet view for data entry.

DETAILED DESCRIPTION

Figure 1:
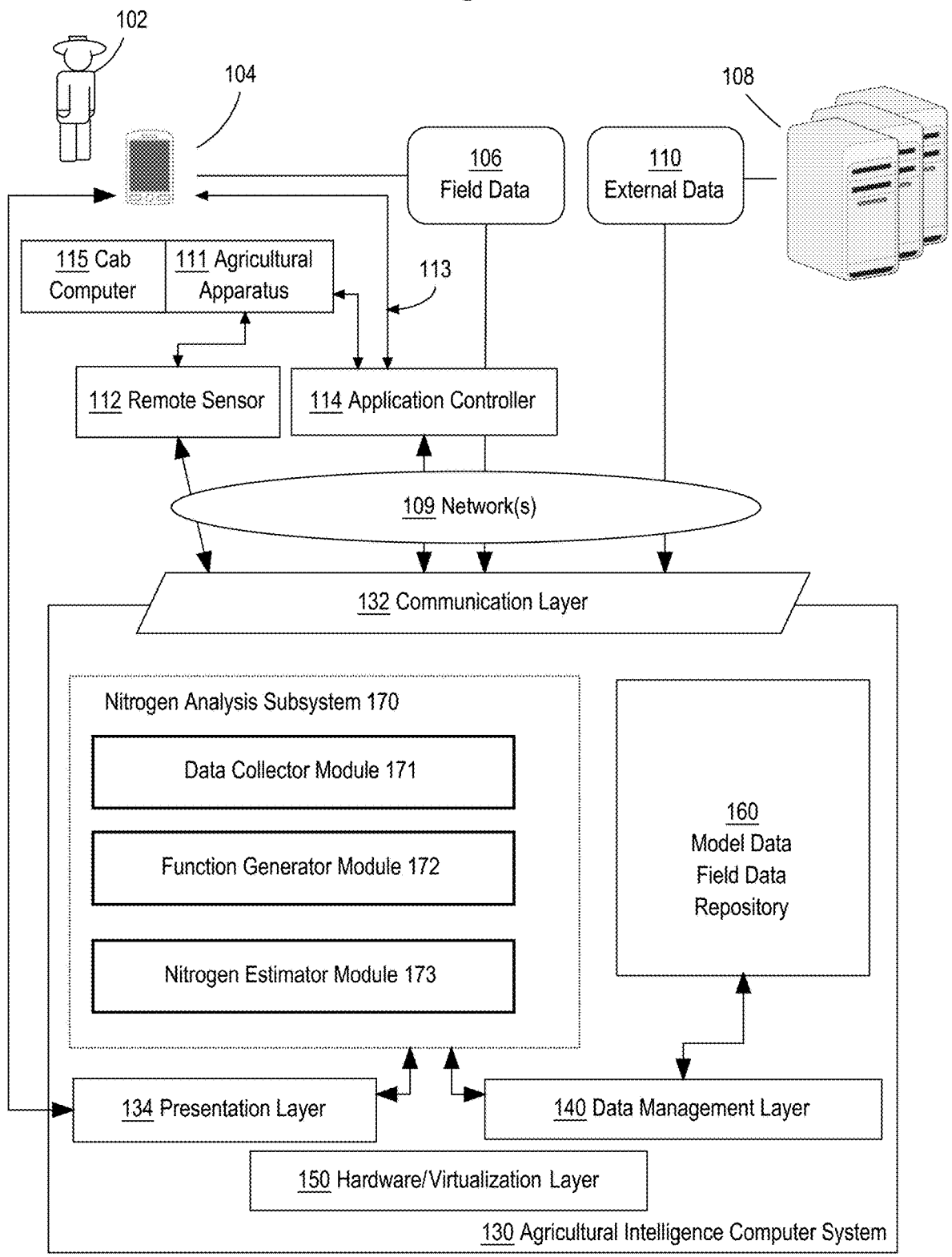
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. The description is provided according to the following outline:

1.0 General Overview
2.0 Example Agricultural Intelligence Computer System
2.1 Structural Overview
2.2 Application Program Overview 2.3 Data Ingest to the Computer System
2.4 Process Overview—Agronomic Model Training
2.5 Nitrogen Analysis Subsystem
  2.5.1 Nitrogen Analysis Subsystem Process Flow
2.6 Implementation Example—Hardware Overview
3.0 Example System Inputs
4.0 Function Generation Techniques
4.1 Linear Regression
  4.1.1 PCA Based Methods
  4.1.2 Shrinkage-based Methods
  4.1.3 Selection of Hyperparameters
4.2 Regression With Vegetation Index
4.3 Non-Linear Regression with Additive Model
4.4 Other Methods
  4.4.1 Hierarchical Bayesian Model
  4.4.2 Curds and Whey Method
5.0 Example Applications
6.0 Extensions and Alternatives
7.0 Additional Disclosure 1.0 General Overview Techniques for determining the value of variables related to nitrogen in crops using multispectral and/or hyperspectral imagery are described.

In some embodiments, machine learning and/or statistical techniques are applied to develop a function that maps between input supplied by remote sensing imagery and the value of nitrogen variables estimated to be held by the crops captured in the remote sensing imagery. In machine learning, the goal is to develop a function that maps between an input space and an output space. In many cases, the function is developed or "trained" by using a set of known input space to output space mappings referred to as a "training set". The training set may be developed by taking remote sensing imagery of test fields and then obtaining the ground truth values of the nitrogen variables through an alternative means such as collecting plant samples from the fields for lab testing. Thus, each entry in the training set may specify one or more band values for a pixel in the remote sensing imagery and the values of the nitrogen variables held by the plant or crop at that pixel. Due to lack of resources, ground truth nitrogen content may not be available for each pixel in the remote sensing imagery. However, the training set may be limited to pixels for which the ground truth is available. Alternatively the ground truth may be inferred from other nearby pixels for which the ground truth is known, such as by averaging or using regression between the pixels with known values to fill in the missing ground truth values.

From the training set, features are selected which are believed to be indicative of the value of nitrogen variables in crops, such as specific bands found in the hyperspectral and/or multispectral imagery, and/or linear/non-linear combinations of the aforementioned bands. The features that are selected may vary between embodiments, such as being dependent on whether multispectral or hyperspectral imagery is available, the technique selected to develop the mapping function, the number of entries that are available in the training set, type of crop being analyzed, and so forth.

Once the features are selected, the features are analyzed to develop the mapping function. During the analysis, an optimization is performed to find the function that best explains the mapping between the features of the input set and the corresponding nitrogen variables. The terms "best", "maximum", and/or "optimum" as used herein do not necessarily refer to a global metric. In many cases a local or approximate maximum of the likelihood of the mapping between the features and the label given the function is sufficient. Different machine learning techniques perform the aforementioned optimizations in different ways. For example, naive Bayes classifiers assume independence of the features given the response variables and estimates a function that explains the association between the features and the response variables. As another example, artificial neural networks model the problem domain as systems of interconnected nodes (representing "neurons") which send messages to one another, often with some nodes representing inputs (such as features), some nodes representing intermediary or "hidden" nodes, and some nodes representing the outputs (such as response variables). Thus, in such models, the estimation of the function involves determining the optimal weights between the edges connecting the nodes that are most likely to explain the mappings presented in the training set. Once the mapping function is trained, a new data point of features can be fed into the mapping function to obtain an estimated value of the response variables. In this case, the features are related to bands for pixels found in remote sensing imagery and the response variables correspond to various nitrogen-related characteristics of plants, such as leaf nitrogen content, stalk nitrogen content, leaf nitrogen uptake, stalk nitrogen uptake, total uptake, and so forth.

In some embodiments, the technique used to develop the mapping function is linear regression. However, one issue that may arise (especially with hyperspectral imagery with large numbers of bands) is that the set of features may be extremely large in comparison to the number of entries available in the training set, which is referred to as a "p>N" problem. In one embodiment, dimensionality reduction techniques are used which project the original features into a smaller set of features which can be used to explain the major variations in the feature space. In another embodiment, shrinkage-based techniques are used which enforce regularizations on feature coefficients to reduce model variances.

In some embodiments, the technique used to develop the mapping function is regression with vegetation index. A vegetation index (VI) is a mathematical combination or transformation of spectral bands that accentuates the spectral properties of plants. In a working system, vegetation indexes have the advantage of requiring relatively few computing resources compared to other techniques. For example, indexes such as MCARI, TCARI, and OSAVI may be utilized. In addition, a two-band normalized difference index (NDI) may also be used. Hyperspectral imagery typically measures 128 different bands, meaning that there are 8128 ((128×127)/2) possible combinations of two wavelengths that can be used in the two-band normalized difference index. In some embodiments, each combination of bands is tested and the combination which produces the most accurate mapping function is used to estimate the nitrogen variables after training has been completed.

In some embodiments, the technique used is regression with additive model. Although linear models are powerful, linear representation may not always be the best relationship between features and nitrogen variables. Thus, techniques such as the generalized additive model (which is a natural extension of the linear model) may be used. However, embodiments which use the generalized additive model may not be able to handle cases where the number of features is larger than the sample size of entries of the training set. Thus, in such cases, feature selection may be applied to the training set to reduce the number of features if the sample size is relatively small.

In some embodiments, techniques such as hierarchical Bayesian models and the Curds and Whey method can also be applied to develop a mapping function between a set of features and nitrogen variables of crops.

Other features and aspect of the disclosure will become apparent in the drawings, description, and claims.

2. Example Agricultural Intelligence Computer System 2.1 Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) pesticide data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines or harvesters. Application controller 114 is communicatively coupled to agricultural intelligence computer system 130 via the network(s) 109 and is programmed or configured to receive one or more scripts to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 6:
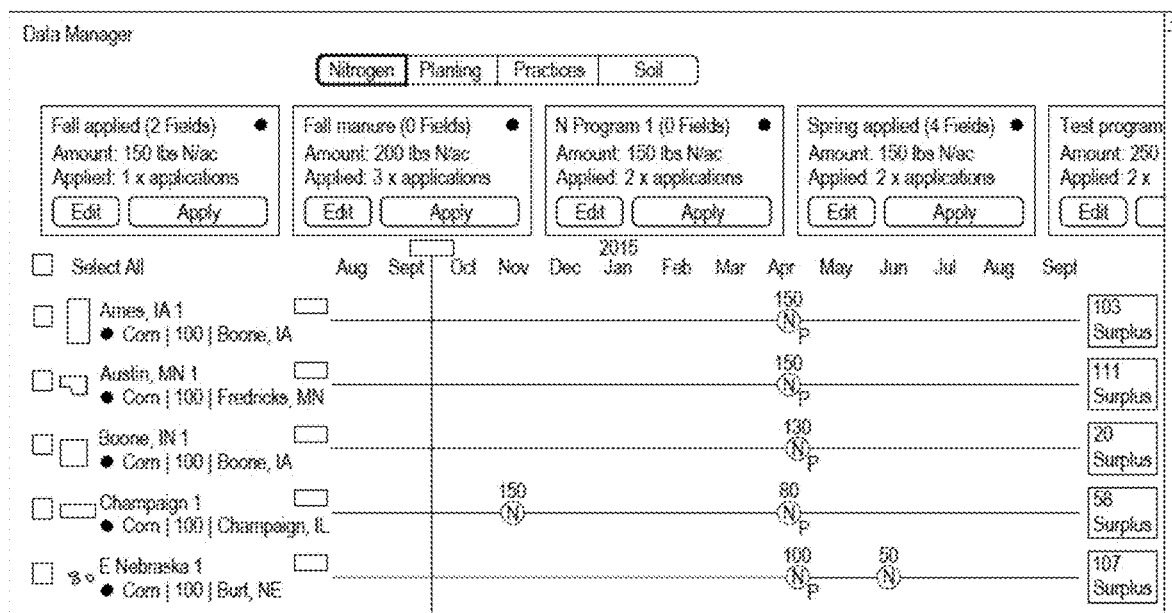
FIG. 6 depicts an example embodiment of a timeline view for data entry.

FIG. 6 depicts an example embodiment of a timeline view for data entry. Using the display depicted in FIG. 6, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 6, the top two timelines have the "Fall applied" program selected, which includes an application of 150 lbs N/ac in early April. The data manager may provide an interface for editing a program. In an embodiment, when a particular program is edited, each field that has selected the particular program is edited. For example, in FIG. 6, if the "Fall applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 6, the interface may update to indicate that the "Fall applied" program is no longer being applied to the top field. While the nitrogen application in early April may remain, updates to the "Fall applied" program would not alter the April application of nitrogen.

Figure 7:
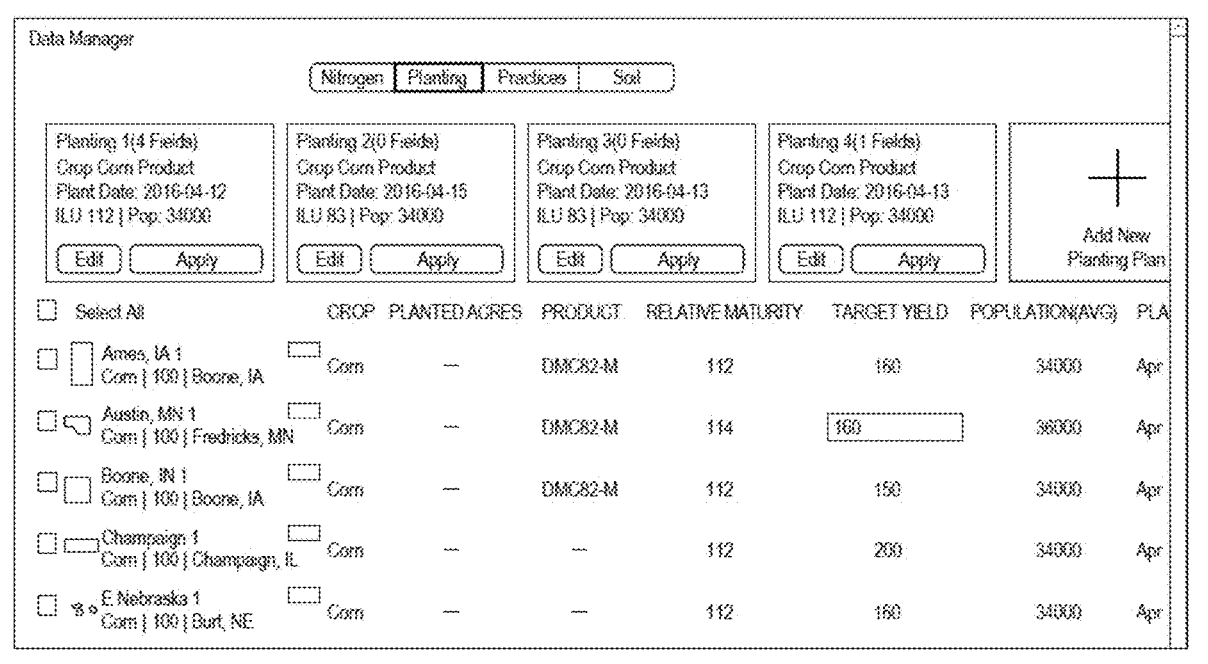

FIG. 7 depicts an example embodiment of a spreadsheet view for data entry. Using the display depicted in FIG. 7, a user can create and edit information for one or more fields. The data manager may include spreadsheets for inputting information with respect to Nitrogen, Planting, Practices, and Soil as depicted in FIG. 7. To edit a particular entry, a user computer may select the particular entry in the spreadsheet and update the values. For example, FIG. 7 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model data may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

Figure 4:
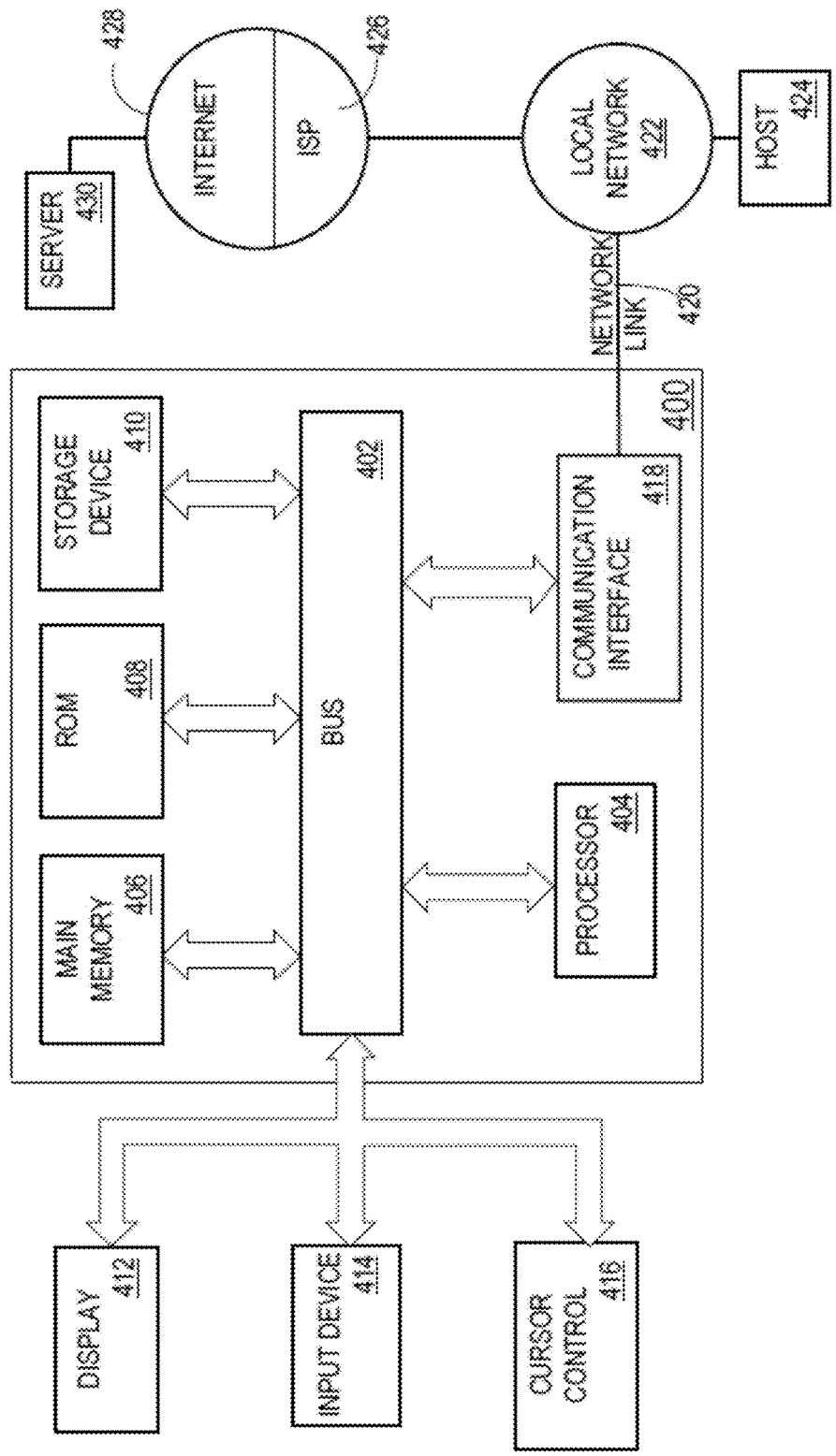
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML, and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

Figure 2:
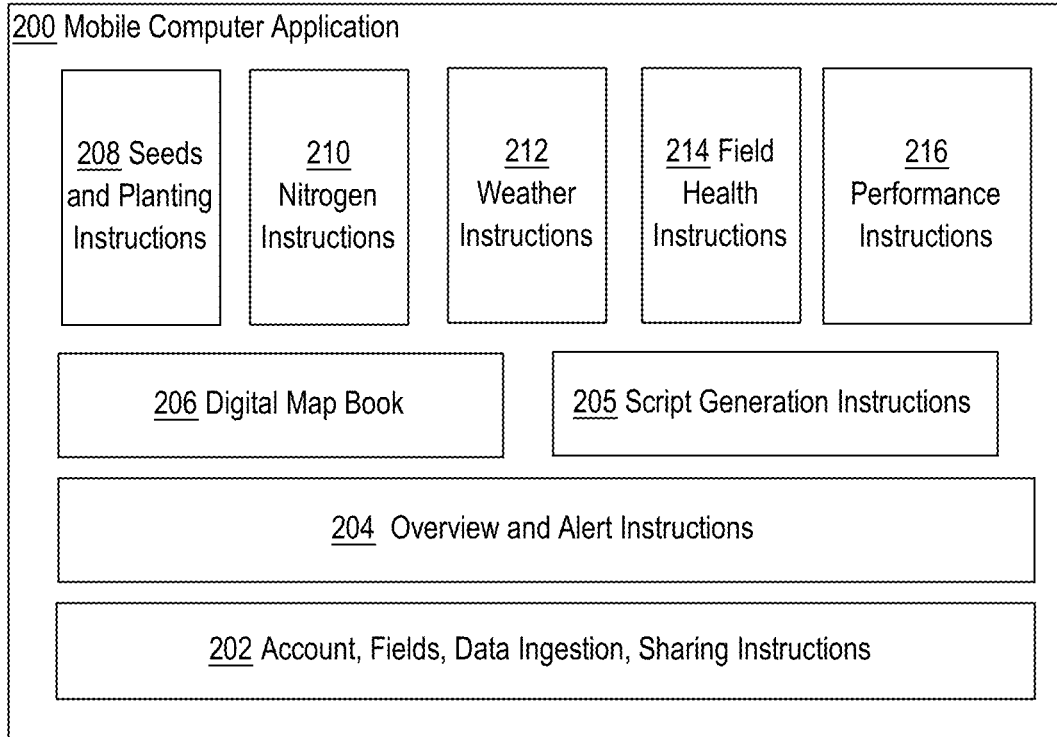
FIG. 2 illustrates two views of an example logical organization of sets of instructions in main memory when an example mobile application is loaded for execution.
Figure 2:
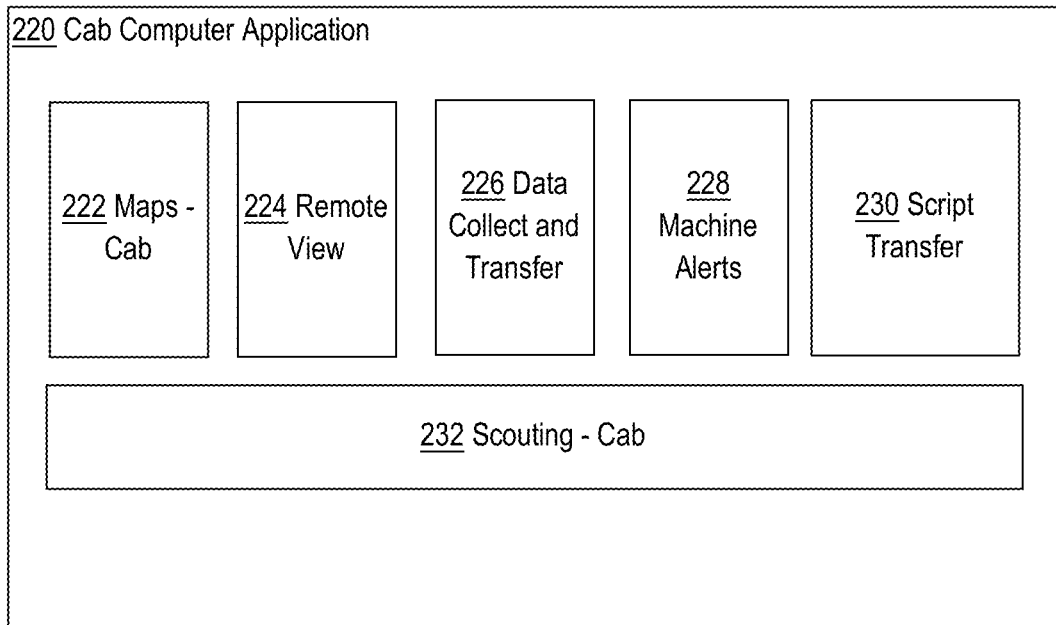

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account-fields-data ingestion-sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally and/or alternatively, a script may be sent directly to cab computer 115 from mobile computer application 200 and/or uploaded to one or more data servers and stored for further use. In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of application zones and/or images generated from subfield soil data, such as data obtained from sensors, at a high spatial resolution (as fine as 10 meters or smaller because of their proximity to the soil); upload of existing grower-defined zones; providing an application graph and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields that have been defined in the system; example data may include nitrogen application data that is the same for many fields of the same grower, but such mass data entry applies to the entry of any type of field data into the mobile computer application 200. For example, nitrogen instructions 210 may be programmed to accept definitions of nitrogen planting and practices programs and to accept user input specifying to apply those programs across multiple fields. "Nitrogen planting programs," in this context, refers to a stored, named set of data that associates: a name, color code or other identifier, one or more dates of application, types of material or product for each of the dates and amounts, method of application or incorporation such as injected or knifed in, and/or amounts or rates of application for each of the dates, crop or hybrid that is the subject of the application, among others. "Nitrogen practices programs," in this context, refers to a stored, named set of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium) application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, hybrid, population, SSURGO, soil tests, or elevation, among others. Programmed reports and analysis may include yield variability analysis, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at machine sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 230 may be programmed to display location-based alerts and information received from the system 130 based on the location of the agricultural apparatus 111 or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In another embodiment, sensors 112 and controllers 114 may comprise weather devices for monitoring weather conditions of fields. For example, the apparatus disclosed in International Pat. Application No. PCT/US2016/029609 may be used, and the present disclosure assumes knowledge of those patent disclosures.

2.4 Process Overview-Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, and harvesting recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 3:
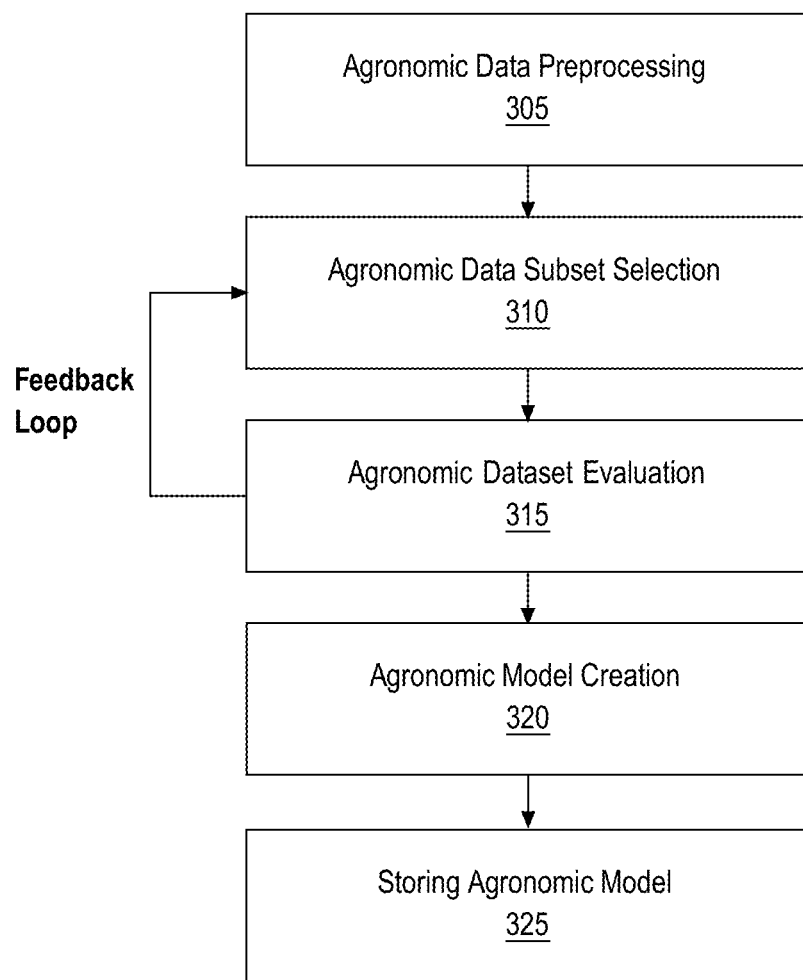
FIG. 3 illustrates a programmed process by which the agricultural intelligence computer system generates one or more preconfigured agronomic models using agronomic data provided by one or more external data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise and distorting effects within the agronomic data including measured outliers that would bias received field data values. Embodiments of agronomic data preprocessing may include, but are not limited to, removing data values commonly associated with outlier data values, specific measured data points that are known to unnecessarily skew other data values, data smoothing techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared using cross validation techniques including, but not limited to, root mean square error of leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5 Nitrogen Analysis Subsystem

In an embodiment, nitrogen analysis subsystem 170 includes components that retrieve ground truth data related to one or more remote sensing images, train a mapping function that maps between one or more features of the remote sensing images and nitrogen variables, and then applies the mapping function to a new remote sensing image. The nitrogen analysis subsystem 170 and the components contained therein may represent software instructions (for example source and/or compiled program code), hardware components (for example application-specific integrated circuits and/or field programmable gate arrays), or combinations thereof. In an embodiment, the nitrogen analysis subsystem 170 includes data collector module 171, function generator module 172, and nitrogen estimator module 173.

2.5.1 Nitrogen Analysis Subsystem Process Flow

Figure 5:
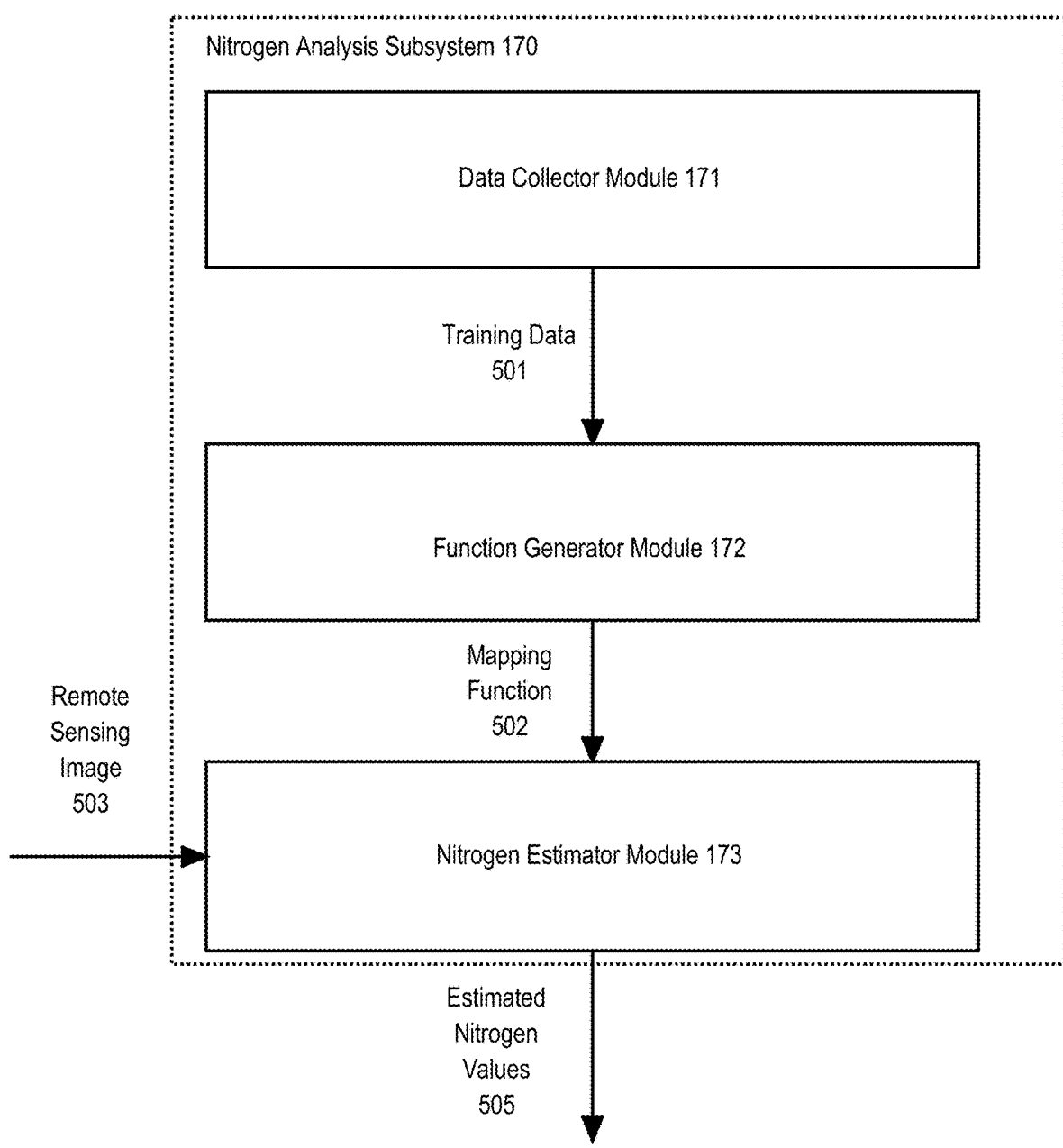
FIG. 5 illustrates a functional overview of a nitrogen analysis subsystem according to an embodiment.

FIG. 5 illustrates an example process flow for the nitrogen analysis subsystem 170 according to an embodiment. In other embodiments, the depicted modules may be divided out into further sub-modules or combined into modules that are responsible for a greater number of tasks than those depicted in FIG. 5.

In FIG. 5, the data collector module 171 generates training data 501 for the function generator module 172. The data collector module 171 may generate the training data 501 by retrieving remote sensing imagery data (e.g. band values for pixels within the imagery) and ground truth nitrogen values from external data 110, model data and field data repository 160, or from another source. For example, a satellite or aircraft may be used to take hyperspectral or multispectral images of a plot of land containing crops, which are then stored in an external database hosted by a third party company who owns and operates the satellite or aircraft. The data collector module 171 can then interface with the external server through one or more protocols or APIs to retrieve the remote sensing imagery. Similarly, the lab which produced the ground truth nitrogen values may also host a server with which the data collector module 171 may interface.

At a time that is approximately concurrent with the taking of the images, samples may be collected from various points within the field. Those samples may then be tested at a remote or on-site lab using spectrometer based techniques to determine the values of nitrogen variables for the crops at that location. The pixels corresponding to the points where the plant samples were taken within the remote sensing images can then be identified, thus allowing the band measurements at those points to be correlated with the "ground truth" nitrogen values measured at those points. In some cases the remote sensing imagery may be taken at a higher resolution than the plant samples. Thus, the median band values across the pixels covered by the plant samples may be used to approximate an image with pixels which are at the same resolution as the plant sampling to simplify the analysis.

In some embodiments, the correlating is done by the data collector module 171 after retrieving the remote sensing imagery and data representing the ground truth nitrogen values (e.g. correlating GPS coordinates with which the nitrogen content was tagged with the pixel within the remote sensing imagery corresponding to those coordinates). However, in other embodiments, the correlating may be done by an external computing device or manually by a human with the data collector module 171 simply retrieving the correlated data. After generating or receiving the correlated data, the data collector module 171 performs feature selection. Initially, all the bands are considered features. Thus, from the initial feature set consisting of the bands for each pixel represented in the correlated data, the data collector module 171 may remove certain bands from the feature set and/or generate new features from linear or non-linear combinations of bands. The exact features selected is dependent on the technique used by the function generator module 172 and thus may vary between different implementations. Examples of features for each described technique can be found below in Section 4.0 ("Function Generation Techniques"). Furthermore, different nitrogen variables may be best correlated with different sets of features. Thus, the set of features which best correlates with leaf nitrogen content may differ from the features which best correlate with stalk nitrogen uptake.

After features have been selected, the feature set and corresponding nitrogen content value for each pixel represented in the correlated data is passed to the function generator module 172 as the training data 501. Additional details regarding the training data 501 and the sources from which the training data 501 may be obtained is explained in further detail below in Section 3.0 ("Example System Inputs").

In an embodiment the function generator module 172 receives the training data 501 and then trains a mapping function 502. The mapping function 502, once trained, takes as input an instance of the features selected by the data collector module 171 and produces as output estimated values for one or more nitrogen variables. In some embodiments, the function generator module 172 generates a different mapping function 502 for each nitrogen variable or the mapping function 502 may represent a bundle of different mapping functions for the various nitrogen variables. However, for the purpose of illustrating clear examples the mapping function 502 is referred to herein as singular. Embodiments of the function generator module 172 may use many different techniques to generate the mapping function 502, such as linear regression, regression with vegetation index, non-linear regression with additive model, and other techniques. Examples of techniques that may be utilized by the function generator module 172 are described below in Section 4.0 ("Function Generation Techniques"). In some embodiments, when the mapping function 502 is trained, the mapping function 502 is stored in the model data and field data repository 160 for later retrieval by the nitrogen estimator module 173 when a new remote sensing image is to be analyzed for the estimated value of nitrogen variables. Thus, the mapping function 502 can be trained once and then used repeatedly for new remote sensing images that are to be analyzed. However, in other embodiments, the function generator module 172 may pass the mapping function 502 to the nitrogen estimator module 173 without first storing the mapping function 502 in the model data and field data repository 160.

In an embodiment, the nitrogen estimator module 173 receives as input the mapping function 502 from the function generator module 172 (or from the model data and field data repository depending on implementation) and a remote sensing image 503. The nitrogen estimator module 173, for each pixel within the remote sensing image 503, performs feature selection to generate a set of features for each of the pixels. In some embodiments, the remote sensing image 503 may be automatically or manually filtered to remove or otherwise cause the nitrogen estimator module 173 to ignore pixels which do not correspond to plant life. For example, a user interface may be presented to the user 102 through the field manager computing device 104 to allow the user 102 to crop or otherwise identify which portions of the image correspond to crop life. Alternatively, the nitrogen estimator module 173 may analyze the bands for each pixel to automatically determine which pixels correspond to plant life, such as using a threshold measurement on a normalized difference vegetation index (NDVI) to determine which pixels to analyze. Once the set of features have been generated for each pixel, the nitrogen estimator module 173 uses those features as input to the mapping function 502 to determine the estimated nitrogen values 505 of the nitrogen variables for each pixel.

In some embodiments, the nitrogen estimator module 173 displays the nitrogen values 505 of the nitrogen variables for each pixel to the user 102 through the field manager computing device 104. For example, leaf nitrogen content may be displayed in a map where each pixel is assigned a color shaded based on relative nitrogen content. Thus, darker shadings may represent areas where leaf nitrogen content is higher and lighter shadings may represent areas where leaf nitrogen content is lower. Furthermore, in some embodiments, the nitrogen estimator module 173 is configured to determine that nitrogen content for one or more areas are below a threshold amount of nitrogen required for the current crop and stage of growth and alerts the user 102 by making said areas on the map or by sending a message (e.g. instant message, phone call, email, fax, etc.) to the user 102 identifying the areas lacking nitrogen. In some embodiments, the nitrogen estimator module 173 also provides the user 102 with an amount of fertilizer that would be sufficient to rectify the deficiency and/or provide a cost estimate to purchase said amount of fertilizer. Additional information regarding the applications of the nitrogen analysis are discussed below in Section 5.0 ("Example Applications").

2.6 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3.0 Example System Inputs

In an embodiment, the ground truth nitrogen measurements obtained by the data collector module 171 include variables associated with nitrogen, including leaf nitrogen content, stalk nitrogen content, leaf nitrogen uptake, stalk nitrogen uptake, and total nitrogen (leaf nitrogen uptake+ stalk nitrogen uptake). The nitrogen measurements are taken from fields of crops, such as by collecting samples of crops at various points along the field for lab analysis. However, not all embodiments may take the exact same types of measurements described above, others may consider fewer or additional nitrogen variables than those listed. The nitrogen measurements then become the ground truth for pixels of remote sensing imagery taken of the field corresponding to the locations where the measurements were taken.

The remote sensing imagery taken by different sensors may measure different bands. For example, hyperspectral imagery typically collects 128 different bands of data for each pixel. As another example, multispectral imagery typically collects bands such as the blue band, green band, red band, near infrared band, mid-infrared band, thermal infrared band, and so forth. Different multispectral cameras may capture different sets of the aforementioned bands. Furthermore, different cameras (for both multispectral and hyperspectral imagery) may take photos at different spatial resolutions. The vehicle used to take the multispectral/hyperspectral images may be satellites which take the images from space or an aircraft which performs a flyover on the fields to take the images. However, in the future additional devices/vehicles for remote sensing imagery may emerge which would also be applicable to the techniques described herein. Thus, the exact vehicle/device used to take the images are not critical. Pixels taken from two different cameras (or at two different heights) may represent different sized areas of the field being studied. If the resolution of the samples and the remote sensing imagery do not match, median or average values of bands over regions of pixels may be taken to resolve the mismatch.

4.0 Function Generation Techniques

As mentioned above, the function generator module 172 receives as input the training data 501, which represents features related to the band values for pixels representing plant life and corresponding "ground truth" nitrogen values for each of the pixels. The pixels represented in the training data 501 do not necessarily have to come from the same image or from images taken proximate in time. The function generator module 172 then generates a mapping function 502 which when supplied with a set of features generates an estimate of a value of a nitrogen variable for the plant life at the represented pixel. The following are examples of different techniques that could be used by the function generator module 172 to train the mapping function 502.

4.1 Linear Regression

Estimating nitrogen content can be viewed as a regression problem in statistics. One of the biggest challenges (especially for hyperspectral images with large numbers of represented bands) is the high-dimensionality of the feature space. Presented below are two examples of techniques that may be used to handle this issue, which is referred to as a p>N problem. However, alternative embodiments may manually select features, such as using a single band for the feature set. For example, linear regression performed on single bands at around the 400 nm or 550 nm have been shown empirically to work fairly well.

4.1.1 PCA Based Methods

The first example technique is to use dimension reduction methods to produce a smaller set of features. For example, Principal Component Analysis (PCA) projects original features into a set of linearly uncorrelated components, which can be used to explain the major variations in the feature space. However, one cannot assert that linear PCA will always detect all structures in a given data set. By the use of suitable kernels, it is possible to map original features into a higher dimension and apply principal component regression in that space One such extension, Kernel-PCA, is described in "Kernel PCA and De-Noising in feature spaces" authored by S. Mika, et al., published in NIPS, volume 4, page 7, 1998, which is hereby incorporated by reference for all purposes as though fully stated herein. With the kernel method, the original linear operations of PCA are done in a reproducing kernel Hilbert space with a non-linear mapping.

The partial least square (PLS) method is another dimension reduction method which can be utilized, such as the one described by Hansen et al. in "Reflectance measurement of canopy biomass and nitrogen status in wheat crops using normalized difference vegetation indices and partial least squares regression", published in *Remote Sensing of Environment,* 86(4): 542-553, 2003, which is hereby incorporated by reference as though fully stated herein. PLS considers not only the correlation structure within the feature space, but also the cross-correlation of features and the response.

4.1.2 Shrinkage-Based Methods

The second type of methods to handle the p>N problem are shrinkage based methods. These methods enforce regularizations on feature coefficients to reduce model variances. Example techniques include Least Absolute Shrinkage and Selection Operator (LASSO), elastic net, and grouped LASSO.

LASSO imposes a L1 penalty of the coefficient vector. By L1 regularization, the technique obtains a sparse solution (thus only using a subset of features to estimate the response). An example implementation of LASSO is described by R. Tibshirani in "Regression shrinkage and selection via the lasso.", published in the *Journal of the Royal Statistical Society, Series B (Methodological)* at pages 267-288, 1996, which is hereby incorporated by reference as though fully stated herein.

Closely related to LASSO, the elastic net method imposes both L1 and L2 penalties. The method has a similar sparsity of representation as LASSO. In addition, the method encourages a grouping effect, where strongly correlated features tend to be in (or out) of the model together. An example of an elastic net is presented in H. Zou et al., in "Regularization and variable selection via the elastic net" published in the *Journal of the Royal Statistical Society: Series B (Statistical Methodology),* 67(2): 301-320, 2005, which is hereby incorporated by reference as though fully stated herein. However, when grouping effects are more obvious, the grouped LASSO is also a viable method. An example of grouped LASSO is described by M. Yuan et al., in "Model selection and estimation in regression with grouped variables", published in the *Journal of the Royal Statistical Society: Series B (Statistical Methodology),* 68(1):49-67, 2006, which is hereby incorporated by reference as though fully stated herein.

4.1.3 Selection of Hyperparameters

Both types of methods described above require certain hyperparameters to be set. The dimension reduction methods need to set the number of components that are used to conduct the regression, and the shrinkage-based methods need to balance weights between fitting errors and penalties. These hyperparameters may be set by cross-validation. For example, splitting the training data 501 into training sets and testing sets. The regression is then trained on the training set, validated on the validation set to determine how well the performance is using certain hyperparameter values, and tested on the testing set to determine how precise and/or accurate the estimates were. The values for the hyperparameters which have been empirically shown to produce better results are then used.

In some cases, PLS has been shown empirically to achieve minimum errors with fewer components compared to PCA. This is due to the fact that PLS also makes use of response values (in this case the ground truth nitrogen) when constructing new directions.

For the regularization-based methods, the balance parameter can also be selected with cross-validation. The selection of the hyperparameters may be based on a validation set and the performance may be reported on the test set. The validation set may be considered part of training because it is used to build the model, such as being used for parameter selection and to avoid overfitting.

4.2 Regression with Vegetation Index

A vegetation index (VI) is a mathematical combination or transformation of spectral bands that accentuates the spectral property of plants. Examples of VIs includes Normalized Difference Vegetation Index (NDVI), Enhanced Vegetation Index (EVI), Normalized Difference Water Index (NDWI), and others. In real applications, the vegetation index approach has the benefit of requiring fewer resources than the other techniques discussed herein from hardware design and data processing perspectives. Examples of different VIs that may be employed by the function generator module 172 are discussed below.

A first example is referred to as Modified Chlorophyll Absorption in Reflection Index (MCARI), which is defined as:

$$MCARI = [(\lambda_{700} - \lambda_{670}) - .2(\lambda_{700} - \lambda_{670})] / \left(\frac{\lambda_{700}}{\lambda_{670}}\right)$$

where $\lambda_x$ stands for the spectral reflectance value at wavelength of x. Additional information related to MCARI can be found in "The use of high spectral resolution bands for estimating absorbed photosynthetically active radiation" in A par, 1994 authored by M. S. Kim et al, the entire contents of which is hereby incorporated by reference as though fully stated herein.

A second example is referred to as Transformed Chlorophyll Absorption in Reflectance Index (TCARI), which is defined as:

$$TCARI = 3[(\lambda_{700} - \lambda_{670}) - .2(\lambda_{700} - \lambda_{670})] / \left(\frac{\lambda_{700}}{\lambda_{670}}\right).$$

Additional information regarding TCARI can be found in "Integrated narrow-band vegetation indices for prediction of crop chlorophyll content for application to precision agriculture" published in *Remote Sensing* of environment, 31(2): 416-426, 2002, authored by D. Haboudane et al., the entire contents of which is incorporated by reference as though fully stated herein.

A third example is referred to as Optimized Soil-Adjusted Vegetation Index (OSAVI) which is defined as, $$OSAVI = (1+0.16)(\lambda_{800} - \lambda_{670})/(\lambda_{800} + \lambda_{670} + 0.16).$$

Additional information regarding OSAVI can be found in "A soil-adjusted vegetation index (SAVI)" published in *Remote sensing of environment*, 25(3):295-309, 1988 authored by A. R. Huete, the entire contents of which is incorporated by reference as though fully stated herein.

In addition to the above indexes, a two-band normalized difference index (NDI) may be used which employ two different wavelengths of the spectrum. The definition is:

$$NDI = (\lambda_2 - \lambda_1)/(\lambda_2 + \lambda_1)$$

which for hyperspectral images results in 8128 ((128×127)/2) different possible indices. Furthermore, in addition to the selection of the band, different formulations of the relationship between the features and the nitrogen variables may also be employed. For example, the relationships may include y~x, y~log(x), log(y)~log(x), and log(y)~x, where x represents the features and y represents the nitrogen variables. Through empirical testing log(y)~x was generally found to perform the best, but this may differ depending on circumstances such as the type of crop being analyzed and the growth stage of the crop.

For hyperspectral remote sensing images, the bands [$\lambda_1$, $\lambda_2$] which through empirical testing produced the best estimations for the nitrogen variables are as follows, leaf nitrogen content [574.5 nm, 514.1 nm], stalk nitrogen content [602.3 nm, 514.1 nm], leaf nitrogen uptake [769.3 nm, 754.6 nm], stalk nitrogen uptake [934.5 nm, 745.1 nm], and total nitrogen uptake [939.4 nm, 735.6 nm]. However, the exact bands which are optimal may differ depending on the type of crop, growth stage of the crop, and other factors.

For multispectral images the bands which through empirical testing produced the best estimations for nitrogen variables are as follows, leaf nitrogen content [blue, green], stalk nitrogen content [blue, green], leaf nitrogen uptake [red-edge, nir], stalk nitrogen uptake [blue, nir], and total nitrogen uptake [blue, nir]. However, the exact bands which are optimal may differ depending on the type of crop, growth stage of the crop, and other factors.

4.3 Non-Linear Regression with Additive Model

Although linear models are powerful and widely used, linear representation may not always be the best relationship between features derived from remote sensing imagery and nitrogen variables of plant life. In some embodiments, a generalized additive model (GAM) may be used by the function generator module 172. Examples of GAMs may be found in Hastie et al., *Generalized additive models*, volume 43, CRC Press, 1990 and Wood et al., *Generalized additive models: an introduction with R*, CRC press, 2006, both of which are hereby incorporated by reference as though fully stated herein. A GAM has the following form:

$$y = \Sigma f_i(X_i) + \epsilon$$

where $f_i$ represents an unspecified smoothing function, which can be learned from the data in parametric or non-parametric ways. However, this model cannot handle the case when the number of features is larger than the sample size and thus may only be applied to the selected feature space. For example, it may be much more expensive to apply the non-linear regression with additive model approach to hyperspectral imagery compared to multispectral imagery due to the large number of bands. Thus, in the hyperspectral case, the feature set may have to be pruned down either manually through empirical testing or using dimension reduction techniques. The selected feature space may be NDI for hyperspectral images and for multispectral images may be the NDI and some raw bands.

For multispectral imagery, the features and formula used that generated the best empirical results for each nitrogen variable are depicted in the table below,

| Formula |
| --- |
| LNP ~ b* + g* + ndi(b, g)* + re + nir |
| log(StNP) ~ ndi(b, g) + g |
| log(LNUPTKlbac) ~ g + r* + re + nir* |
| log(StNuptklbac) ~ b* + r* + nir* |
| log(TNUPTKlbac) ~ s* + r* + re* + nir* |

Where b=blue, g=green, r=red, re=red edge, nir=near infrared, ndi(x,y) means that the NDI formula discussed above is applied, * means that a smoothing transform has been applied to the band.

In some cases, the relationship between certain plant nitrogen variables and spectral bands or indexes may vary for different growing stages. The table below specifies the best GAM bands and formulas found through empirical testing for stage V9-V11 plant growth:

| Formula |
| --- |
| LNP ~ b* + g* + ndi(b, g)* + re + nir |
| StNP ~ ndi(b, g) + g |
| LNUPTKlbac ~ b + ndi(re, nir) + re + nir |
| StNuptklbac ~ b + g + r + ndi(b, r) + nir |
| TNUPTKlbac ~ b + g + re + nir + ndi(re, nir) |

Furthermore, the table below specifies the best GAM bands and formulas for stage R3-R4 growth found through empirical testing:

| Formula |
| --- |
| LNP ~ g* + ndi(b, g)* + re + nir |
| StNP ~ ndi(re, b) + g |
| LNUPTKlbac ~ ndi(re, nir) + g |
| log(StNuptklbac) ~ g + re + nir |
| log(TNUPTKlbac) ~ ndi(re, nir) |

However, the above tables are only the results of testing on a select number of samples. As such, there is no guarantee that the features and formulas depicted above are necessarily optimal in a general sense and may vary based on factors such as the type of crop that is being analyzed.

4.4 Other Methods

There are also other methods that may be applied other than regression methods that can improve performance in certain situations. Two other examples of regression methods are provided below.

4.4.1 Hierarchical Bayesian Model

In some cases, stage-specific models can improve the performance of measuring nitrogen uptake estimations. This implies that the relationship between nitrogen uptake and the features is stage-dependent. A hierarchical Bayesian model can exploit the relationships among different stages and is defined as:

$$\gamma_{s,i}|\beta_s,\sigma_s^2 \sim N(\beta_s X_{s,i}, \sigma_s^2 I)$$

$$\beta_s|\mu,\gamma^2 \sim N(\mu,\gamma^2)$$

where $\beta_s$ is the random coefficient for stage s that comes from a normal distribution; $\mu$, $\gamma^2$, and $\sigma^2$ are random variables with uniform prior distributions.

4.4.2 Curds and Whey Method

The Curds and Whey method is described in L. Breiman et al., "Predicting multivariate responses in multiple linear regression", *Journal of the Royal Statistical Society: Series B (Statistical Methodology)*, 59(1):3-54, 1997, which is hereby incorporated by reference as though fully stated herein. The Curds and Whey method can be used to handle the problem of predicting multiple nitrogen variables from the same set of features. The idea is that one can take advantage of correlations between the response variables to improve overall predictive accuracy compared with the individual regressions. The method is performed in four steps: 1) Transform features to the canonical coordinate system, 2) Perform a separate Ordinary Least Square (OLS) regression on each transformed feature, 3) Separately scale (shrink) each prediction by a factor and, 4) Transform back to the original coordinate system.

5.0 Example Applications

The techniques described herein can be used to determine the value of nitrogen variables, such as nitrogen content and uptake, held by crops within a field monitored by a remote sensing device, such as an airplane or satellite.

In an embodiment, the user 102 (such as a farmer managing a field of crops) uses the field manager computer device 104 to send a request to the agricultural intelligence computer system 130 for a nitrogen analysis of a particular field. For example, the user 102 may specify the field by coordinates which the agricultural intelligence computer system 130 then uses to identify a remote sensing image stored in the model data and field data repository 160 or external data 110 which corresponds to the field. However, in other embodiments, the user 102 may submit the remote sensing image directly which may be manually cropped by the user to focus on the desired field or automatically cropped by the agricultural intelligence computer system 130 or field manager computer device 104 to focus on a field of crops depicted within the image. In response to receiving the request, the agricultural intelligence computer system 130 invokes the nitrogen estimator module 173 which then uses the mapping function 502 generated by the function generator module 172 to estimate the value of nitrogen variables associated with the field. The mapping function 502 if already generated may be retrieved from the model data and field data repository 160. However, other embodiments may dynamically generate the mapping function 502 in response to receiving the request. The value of the nitrogen variables is then sent to the field manager computer device 104 for display to the user 102. Furthermore, as more training data 501 becomes available, the nitrogen analysis subsystem 170 may periodically regenerate the mapping function 502 by supplying the function generator module 172 with the updated data in an attempt to generate a more accurate mapping function 502.

In some embodiments, rather than being triggered solely on the user 102 using the field manager computer device 104 to send a request, the agricultural intelligence computer system 130 may be configured to automatically provide updates to the user 102. For example, the agricultural intelligence computer system 130 may be configured to, every set period of time, perform an analysis of the latest remote sensing images available for the field and send an update to the user 102 by email, fax, automated telephone call, text message, and so forth. In some embodiments, the analysis is triggered by an alert sent from an external server that informs the agricultural intelligence computer system 130 that new remote sensing images of the field are available. For example, external server may be owned and operated by a third party business that specializes in taking remote sensing images via aircrafts and/or satellites.

In some embodiments, instead of or in addition to causing the value of the nitrogen variables to be displayed to the user 102, the agricultural intelligence computer system 130 also generates an estimate of the amount of fertilizer that would need to be added to the field to reach optimal crop yield based on a number of factors such as, estimated current nitrogen of the field (as provided by the nitrogen estimator module 173), crop type, crop stage of growth, soil type, and so forth. For example, Lijuan Xu et al. in "Generating Digital Models of Relative Yield of a Crop based on Nitrate Values in the Soil", application Ser. No. 14/968,729, filed Dec. 14, 2015 describes a number of methods for estimating the yield of a crop based on nitrate values in the soil, the entire contents of the aforementioned application is hereby incorporated for all purposes as though fully stated herein. Thus, by optimizing the model described in the aforementioned application, the agricultural intelligence computer system 130 can determine the amount of nitrate the soil needs to contain to reach optimum crop yield. Furthermore, this optimal amount of nitrate can then be compared to the values estimated to currently exist in the soil based on the analysis performed by the nitrogen analysis subsystem 170. If the current values for the field estimated from the remote sensing imagery falls a threshold distance from the optimal levels indicated by the digital model of crop yield, the agricultural intelligence computer system 130 generates an alert to inform the user 102 that the field needs redressing. The alert may take the form of an email, text message, automated phone call, fax, and so forth. Furthermore, the agricultural intelligence computer system 130 may automatically calculate the amount of fertilizer required to bring the field to an optimum level of nitrate that is estimated to produce optimal yield for the crop.

In some embodiments, the techniques discussed herein may be implemented in software, hardware, or a combination of software and hardware within a hand-held device that can be used to analyze plant samples. For example, the hand-held device may include sensors capable of detecting the bands of light which reflect off of the plant sample and then automatically use the techniques and formulas described herein to determine estimated nitrogen content and uptake values. In some cases, the hand-held device may be a special purpose device that is configured to use one particular technique, such as NDI, to reduce the complexity of the device and therefore limit the computing resources required by the hand-held device to estimate nitrogen content and uptake values.

6.0 Extensions and Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

7.0 Additional Disclosure

Aspects of the subject matter described herein are set out in the following numbered clauses:

1. A method comprising: an agricultural intelligence computer receiving one or more band values for one or more pixels of one or more remote sensing images and, for each pixel of the one or more pixels, a corresponding nitrogen ground truth value of a nitrogen variable for the pixel; the agricultural intelligence computer training a mapping function based on the one or more band values for the one or more pixels and, for each pixel of the one or more pixel, the corresponding nitrogen ground truth value, wherein the mapping function maps between a set of features related to the one or more band values of the one or more pixels and an estimated value of the nitrogen variable; the agricultural intelligence computer receiving a new remote sensing image, wherein the new remote sensing image specifies, for one or more pixel of the new remote sensing image, one or more band values for the pixel of the new remote sensing image; the agricultural intelligence computer generating, for each pixel of the one or more pixels of the new remote sensing image, an respective estimated value of the nitrogen variable for the pixel using the mapping function; the agricultural intelligence computer sending, for each pixel of the one or more pixels, the respective estimated value of the nitrogen variable for the pixel to a field manager computing device.

2. The method of Clause 1, wherein the field manager computing device, in response to receiving the respective estimated value of the nitrogen variable for each pixel of the one or more pixel displays the respective estimated value of the nitrogen variable for each pixel of the one or more pixels.

3. The method of Clause 2, wherein the field manager computing device displays the respective estimated value of the nitrogen variable for each pixel of the one or more pixels using a heat map.

4. The method of any of Clauses 1-3, wherein the agricultural intelligence computer trains the mapping function using linear regression.

5. The method of Clause 4, wherein the one or more remote sensing images are hyperspectral images and the agricultural computer trains the mapping function using linear regression with a dimension reduction based technique or a shrinkage based technique.

6. The method of any of Clauses 1-5, wherein the agricultural intelligence computer trains the mapping function using a vegetation index.

7. The method of Clause 6, wherein the vegetation index is a two-band normalized difference index.

8. The method of Clause 7, wherein the one or more remote sensing images are hyperspectral images, the nitrogen variable is leaf nitrogen content, a first band of the two-band normalized difference index is approximately 574.5 nm and a second band of the two-band normalized difference index is approximately 514.1 nm.

9. The method of Clause 7, wherein the one or more remote sensing images are multispectral images, the nitrogen variable is leaf nitrogen content, a first band of the two-band normalized difference index is blue and a second band of the two-band normalized difference index is green.

10. The method of any of Clauses 1-9, wherein the agricultural intelligence computer trains the mapping function using non-linear regression with additive model.

11. The method of any of Clauses 1-10, wherein the new remote sensing image is an image of a field of crops, and further comprising the agricultural intelligence computer determining a recommend amount of nitrogen to add to the field to optimize a yield of the crops based on the respective estimated nitrogen value for the nitrogen variable for each pixel of the one or more pixels of the new remote sensing image and an optimal amount of nitrogen for the crops.

12. One or more non-transitory computer-readable media storing instructions that, when executed by one or more computing devices, causes performance of any one of the methods recited in Clauses 1-11.

13. A system comprising one or more computing devices comprising components, implemented at least partially by computing hardware, configured to implement the steps of any one of the methods recited in Clauses 1-11.

What is claimed is:

1. A method comprising:
an agricultural intelligence computer receiving one or more band values for one or more pixels of one or more remote sensing images and, for each pixel of the one or more pixels, a corresponding nitrogen ground truth value of a nitrogen variable for the pixel;
the agricultural intelligence computer training a mapping function based on the one or more band values for the one or more pixels and, for each pixel of the one or more pixel, the corresponding nitrogen ground truth value, wherein the mapping function maps between a set of features related to the one or more band values of the one or more pixels and an estimated value of the nitrogen variable;
the agricultural intelligence computer receiving a new remote sensing image, wherein the new remote sensing image specifies, for one or more pixel of the new remote sensing image, the one or more band values for the pixel of the new remote sensing image;
the agricultural intelligence computer generating, for each pixel of the one or more pixels of the new remote sensing image, a respective estimated nitrogen value of the nitrogen variable for the pixel using the mapping function;

the agricultural intelligence computer determining a recommended amount of nitrogen to add to a field to optimize a yield of crops based on the respective estimated nitrogen value for the nitrogen variable for each pixel of the one or more pixels of the new remote sensing image and an optimal amount of nitrogen for the crops;

in response to determining the recommended amount of nitrogen for the field, the agricultural intelligence computer displaying, on a computer display device, a map in which each pixel is assigned a color shaded based on a respective estimated value of the recommended amount of a nitrogen variable generated for a pixel of the one or more pixels; wherein dark shadings in the map represent areas where leaf nitrogen content is high; wherein light shadings in the map represent areas where leaf nitrogen content is low.

2. The method of claim 1, wherein the computer display device displays the respective estimated value of the nitrogen variable for each pixel of the one or more pixels using a heat map.

3. The method of claim 1, wherein the agricultural intelligence computer trains the mapping function using linear regression.

4. The method of claim 3, wherein the one or more remote sensing images are hyperspectral images and the agricultural intelligence computer trains the mapping function using linear regression with a dimension reduction based technique or a shrinkage based technique.

5. The method of claim 1, wherein the agricultural intelligence computer trains the mapping function using a vegetation index.

6. The method of claim 5, wherein the vegetation index is a two-band normalized difference index.

7. The method of claim 6, wherein the one or more remote sensing images are hyperspectral images, the nitrogen variable is leaf nitrogen content, a first band of the two-band normalized difference index is approximately 574.5 nm and a second band of the two-band normalized difference index is approximately 514.1 nm.

8. The method of claim 6, wherein the one or more remote sensing images are multispectral images, the nitrogen variable is leaf nitrogen content, a first band of the two-band normalized difference index is blue and a second band of the two-band normalized difference index is green.

9. The method of claim 1, wherein the agricultural intelligence computer trains the mapping function using non-linear regression with additive model.

10. One or more non-transitory computer-readable storage media storing one or more computer instructions which, when executed by one or more processors, cause the one or more processors to perform:

receiving, by an agricultural intelligence computer, one or more band values for one or more pixels of one or more remote sensing images and, for each pixel of the one or more pixels, a corresponding nitrogen ground truth value of a nitrogen variable for the pixel;

training a mapping function based on the one or more band values for the one or more pixels and, for each pixel of the one or more pixel, the corresponding nitrogen ground truth value, wherein the mapping function maps between a set of features related to the one or more band values of the one or more pixels and an estimated value of the nitrogen variable;

receiving a new remote sensing image, wherein the new remote sensing image specifies, for one or more pixel of the new remote sensing image, the one or more band values for the pixel of the new remote sensing image;

generating, for each pixel of the one or more pixels of the new remote sensing image, a respective estimated nitrogen value of the nitrogen variable for the pixel using the mapping function;

determining a recommended amount of nitrogen to add to a field to optimize a yield of crops based on the respective estimated nitrogen value for the nitrogen variable for each pixel of the one or more pixels of the new remote sensing image and an optimal amount of nitrogen for the crops;

in response to determining the recommended amount of nitrogen for the field, displaying, on a computer display device; a map in which each pixel is assigned a color shaded based on a respective estimated value of the recommended amount of a nitrogen variable generated for a pixel of the one or more pixels; wherein dark shadings in the map represent areas where leaf nitrogen content is high; wherein light shadings in the map represent areas where leaf nitrogen content is low.

11. The one or more non-transitory computer-readable storage media of claim 10, wherein the computer display device displays the respective estimated value of the nitrogen variable for each pixel of the one or more pixels using a heat map.

12. The one or more non-transitory computer-readable storage media of claim 10, wherein the agricultural intelligence computer trains the mapping function using linear regression.

13. The one or more non-transitory computer-readable storage media of claim 12, wherein the one or more remote sensing images are hyperspectral images and the agricultural intelligence computer trains the mapping function using linear regression with a dimension reduction based technique or a shrinkage based technique.

14. The one or more non-transitory computer-readable storage media of claim 10, wherein the agricultural intelligence computer trains the mapping function using a vegetation index.

15. The one or more non-transitory computer-readable storage media of claim 14, wherein the vegetation index is a two-band normalized difference index.

16. The one or more non-transitory computer-readable storage media of claim 15, wherein the one or more remote sensing images are hyperspectral images, the nitrogen variable is leaf nitrogen content, a first band of the two-band normalized difference index is approximately 574.5 nm and a second band of the two-band normalized difference index is approximately 514.1 nm.

17. The one or more non-transitory computer-readable storage media of claim 15, wherein the one or more remote sensing images are multispectral images, the nitrogen variable is leaf nitrogen content, a first band of the two-band normalized difference index is blue and a second band of the two-band normalized difference index is green.

18. The one or more non-transitory computer-readable storage media of claim 10, wherein the agricultural intelligence computer trains the mapping function using non-linear regression with additive model.

* * * * *